United States Patent [19]

Rufin et al.

[11] Patent Number: 4,975,014

[45] Date of Patent: Dec. 4, 1990

[54] HIGH TEMPERATURE LOW THERMAL EXPANSION FASTENER

[75] Inventors: Antonio C. Rufin, Seattle; Willard N. Westre, Bellevue, both of Wash.

[73] Assignee: The Boeing Company, Seattle, Wash.

[21] Appl. No.: 401,907

[22] Filed: Sep. 1, 1989

[51] Int. Cl.⁵ .............................................. F16B 35/02
[52] U.S. Cl. ................................... 411/385; 411/401; 403/30; 403/408.1
[58] Field of Search .................. 403/28, 29, 30, 408.1; 411/385, 383, 411, 424, 546, 900, 901, 902

[56] References Cited

U.S. PATENT DOCUMENTS

| | | |
|---|---|---|
| 2,865,663 | 12/1958 | Shellman et al. . |
| 4,024,688 | 5/1977 | Calini . |
| 4,322,192 | 3/1982 | Zavada et al. . |
| 4,485,545 | 12/1984 | Caverly .......................... 403/28 X |
| 4,499,646 | 2/1985 | Allor et al. . |
| 4,512,699 | 4/1985 | Jackson et al. . |
| 4,575,047 | 3/1986 | Boos et al. . |
| 4,690,617 | 9/1987 | Oda et al. . |
| 4,777,844 | 10/1988 | DeBell et al. . |
| 4,834,569 | 5/1989 | Foote et al. . |

FOREIGN PATENT DOCUMENTS 562675 10/1977 U.S.S.R. ........................... 403/408.1
2087503 5/1982 United Kingdom .

OTHER PUBLICATIONS

NASA Technical Paper 2226, Theoretical Basis for Design of Thermal-Stress-Free Fasteners, Max L. Blosser and Robert R. McWithey, Dec. 1983.

Primary Examiner—Andrew V. Kundrat
Attorney, Agent, or Firm—M. Henry Halle

[57] ABSTRACT

A high-temperature, low-thermal expansion fastener for joining low thermal expansion refractory materials includes a pin with an inset portion on the shank of the pin that forms a head-facing shoulder, at least one shell insert which is seatable about the inset portion, and an internally threaded member which can be screwed onto the threaded outer surface of the shell inserts to maintain the inserts in abutting relationship with the inset portion. Forces within the fastener are transferred from the internally threaded member to the shell inserts which in turn press against the head-facing shoulder on the pin shank to place the shank in tension. The fastener parts, including a spacer, may be selected to compensate for thermal expansion or contraction of the fastened elements.

14 Claims, 1 Drawing Sheet

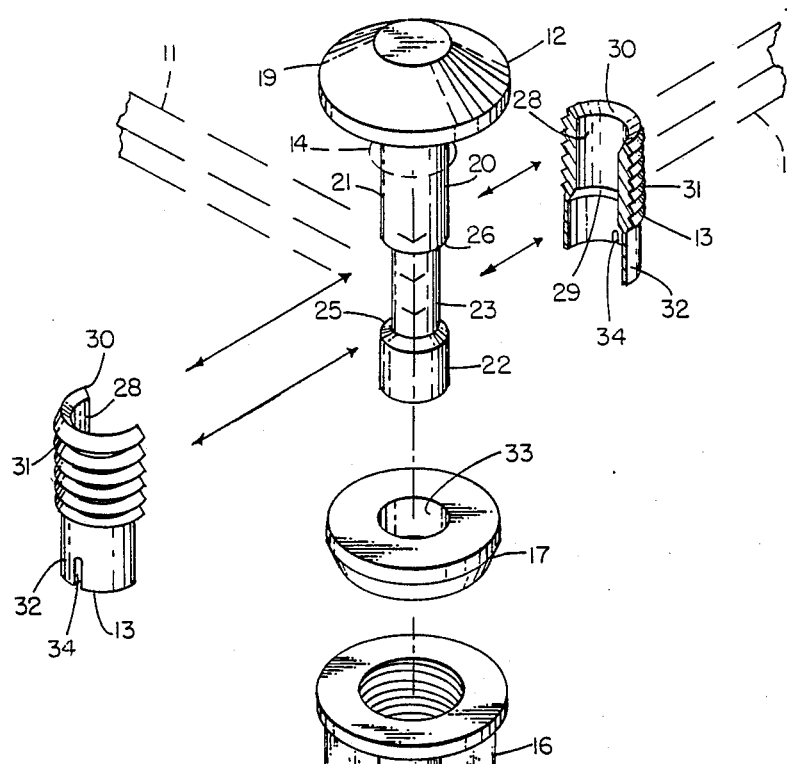
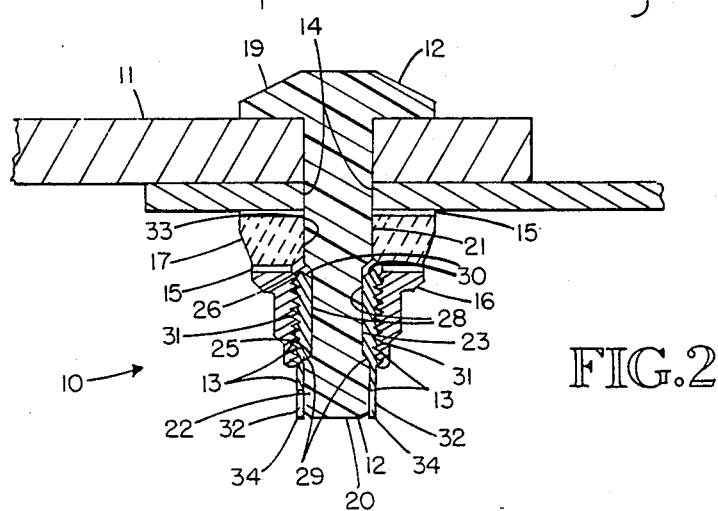

HIGH TEMPERATURE LOW THERMAL EXPANSION FASTENER

BACKGROUND OF THE INVENTION

1. Field of the Invention

This invention pertains generally to bolted fastener joints for use at high temperatures, and more particularly to a fastener which maintains high preload levels at elevated temperatures when used to join high-temperature refractory materials.

2. Description of the Related Art

Various types of fasteners have been developed which are designed to maintain joint clamp-up at high temperatures by compensating for dissimilar thermal strains when the fastener and the structures being joined are made from materials with different coefficients of thermal expansion. These fasteners are designed to provide a snug fit between the structures which they connect (typically low-thermal expansion materials) at all temperatures during extreme temperature cycling without producing excessive thermal stress. For example, U.S. Pat. No. 4,512,699 to Jackson et al. discloses a "DAZE" fastener for use when the fastener parts and structural elements have substantially different coefficients of thermal expansion. The DAZE fastener system provides frusoconical abutting surfaces between the structural elements and fastener parts to translate any differences in thermal expansion or contraction between the parts into a sliding motion to avoid deleterious thermal stresses in the joint. The DAZE fastener is designed to allow unrestrained expansion of the fastener parts away from the coincident verticies of the cone formed by the frustoconical fastener head and a plane defined by the mating surface between the fastener's metal washer and spacer washer. With the exception of the DAZE fastener's spacer washer, which is formed of the same material as the structural elements, the entire DAZE fastener is formed of metal or alloy.

U.K. Patent No. GD 2,087,503 A discloses a fastener which includes a thermally responsive spacer, such as a washer, with at least two parts which have mutually contacting faces inclined with respect to the direction of the tensile force. The two parts are made of materials with different coefficients of thermal expansion chosen such that the two members expand or contract relative to one another to compensate for the differential thermal expansions of the components being fastened, and the fastener bolt. Both this and the DAZE fastener utilize intricate frustoconical sliding surfaces which compensate for the differences in thermal expansion. Those relatively lengthy parts in both fasteners which bear tensile force are formed of metal.

The coefficient of thermal expansion for metals ranges from $3 \times 10^{-6}$ to $13 \times 10^{-6}$ in./in./°F., with the coefficient of thermal expansion for steel being about $10 \times 10^{-6}$ in./in./°F. In contrast, ceramic materials have coefficients of thermal expansion of about $1 \times 10^{-6}$ to $4 \times 10^{-6}$ in./in./°F. Carbon-carbon (C—C) composite materials also may have low coefficients of thermal expansion. When connecting sheets or panels of low thermal expansion materials, such as ceramics or C—C which are used at high temperatures (e.g. above 1500° F.), it is desirable to utilize a fastener with similar thermal expansion characteristics. Additionally, it is desirable that the fastener does not require possibly deleterious countersinking in the structural elements, or frustoconical fastener surfaces which Preclude simplicity of design. The fastener should be moderately self-aligning thereby requiring less tolerance control, and should not require that the holes through the fastened structures be drilled or reamed simultaneously. The fastener also should be capable of connecting fairly thin pieces of material with thickness below 0.25 inches, and should be significantly lighter and stronger than current designs.

SUMMARY OF THE INVENTION

The present invention solves the aforementioned and other problems of the prior art, and provides a fastener which can be used easily and successfully in a high temperature environment to join at least two elements of selected thickness with holes aligned to receive the fastener. The fastener includes a pin usually formed of a material having a coefficient of axial thermal expansion similar to or less than the coefficient of axial thermal expansion of the elements being joined, at least one externally threaded shell insert which fits over an inset portion of the pin shank, and an internally threaded member or nut which rotates onto the threads of the shell inserts.

The pin includes a head with greater cross-sectional dimension than the aligned holes, and the shank which adjoins the head. The shank includes a distal portion which has less cross-sectional dimension than the head, and the inset portion located between the head and distal portion. The inset portion has less cross-sectional dimension than the distal portion of the shank so that a head-facing shoulder is formed near where the distal portion joins the inset portion. Additionally, the pin shank may include a proximate portion which extends between the head and inset portion and which is about equal in cross-sectional dimension to the cross-sectional dimension of the distal portion.

Each shell insert includes an inner surface which is seatable in the inset portion of the pin shank, a distal-facing surface, and an outer surface which is threaded and which has a radius of curvature at least equal to the radius of curvature of the distal portion of the shank. Each shell insert is positionable around the shank inset portion so that its distal-facing surface abuts against the shank's head-facing shoulder.

The internally threaded member has a selected axial thickness and may be rotated onto the threaded outer surface of the shell inserts to maintain the inserts in abutting relationship with the inset portion of the shank.

The fastener may include a spacer made with a second material usually having a coefficient of thermal expansion less than that of the pin. The spacer has a central hole of greater cross-sectional dimension than the distal portion so that it fits over the shank of the pin between the elements being fastened and the internally threaded member.

The parts of the fastener can be selected to match the expansion or contraction of the fastened elements so that thermally induced stresses are minimized or precluded at the elevated temperature. A greater portion of the fastener is non-metallic, since preferably the only metallic parts are the shell inserts and the internally threaded member or nut. The fastener therefore utilizes low thermal expansion materials which lend simplicity to the fastener design. The fastener does not include frustoconical fastener parts which have to be matched and does not require countersinking or other similarly deleterious machining operations on the elements being joined. The fastener of the present invention is moderately self-aligning and can be used to join relatively thin elements. Additionally, the fastener is significantly lighter and stronger than current thermal fasteners and does not require holes to be drilled or reamed simultaneously through the two or more elements being fastened together.

Further objects, features, and advantages of the invention will be apparent from the following detailed description when taken in conjunction with the accompanying drawings.

BRIEF DESCRIPTION OF THE DRAWINGS

FIG. 1 is an exploded perspective view of the high-temperature, low-thermal expansion fastener of the present invention.

FIG. 2 is a longitudinal section view of the high-temperature, low-thermal expansion fastener joining together two elements.

DESCRIPTION OF THE PREFERRED EMBODIMENT

Referring more particularly to the drawings, wherein like numbers refer to like parts, FIG. 1 shows the high-temperature, low-thermal expansion fastener 10 in exploded perspective view. FIG. 2 shows the fastener 10 joining two sheets or elements 11 which are both formed of low-thermal expansion refractory materials such as carbon-carbon (C—C), ceramic matrix composites or monolithic ceramics. As shown in FIGS. 1 and 2, the preferred fastener 10 includes a pin 12, first and second shell inserts 13, first and second small washers 15 (optional), an internally threaded member or nut 16, and a spacer 17.

The pin 12 preferably is formed of a material having a coefficient of axial thermal expansion not extremely different from the coefficient of axial thermal expansion of the sheets 11, and includes a head 19 with a first diameter, and a shank 20 adjoining the head 19 and extending distally therefrom. As shown in FIGS. 1 and 2, the shank 20 includes a proximate portion 21 adjoining the head 19, a distal portion 22 at the distal end of the shank 20, and an inset portion 23 which extends between the proximate portion 21 and the distal portion 22. The distal portion 22 of the shank 20 has a second diameter which is less than the first diameter of the head 19. The inset portion 23 has a third diameter which is less than the second diameter of the distal portion 22 so that a head-facing shoulder 25 is formed near where the distal portion 22 adjoins the inset portion 23. The proximate portion 21 has a fourth diameter which is substantially equal to the second diameter of the distal portion 22. Since the inset portion 23 has a smaller diameter than the proximate portion 21, a distal-facing shoulder 26 is formed near where the proximate portion 21 adjoins the inset portion 23.

The material from which the preferred pin 12 is formed is a ceramic composite with silicon carbide whisker reinforced alumina (aluminum oxide) in random orientation within the pin 12. This fiber or microscopic whisker reinforcement gives the pin 12 an inherent tensile strength and a low coefficient of thermal expansion. Alternatively, the pin 12 could be formed from monolithic ceramics, other ceramic matrix composites, or other materials which give the pin 12 high tensile strength, high shear strength, high fracture toughness, resistance to heat, and a relatively moderate coefficient of thermal expansion.

The first and second shell inserts 13 shown in perspective view in FIG. 1 and in section view in FIG. 2 preferably are roughly semicylindrical in shape. They each include a semicylindrical inner surface 28 which is seatable on the cylindrical inset portion 23 of the pin 12, a distal-facing surface 29, a head-facing surface 30, and an outer surface 31 which is threaded and which has a radius of curvature at least equal to a radius of curvature of the distal portion 22 of the pin 12. In the fastener 10 shown in FIGS. 1-2, the semicylindrical inner surfaces 28 of the inserts 13 each have a radius of curvature approximately equal to the radius of curvature of the cylindrical inset portion 23. The inserts 13, therefore, conform in shape to the inset portion 23 of the shank 20.

As is best shown in FIG. 2, the preferred inserts 13 also each include an extended portion 32 which covers or fits over the the distal portion 22 of the pin 12 when the inner surface 28 of the insert 13 bears against the inset portion 23 of the pin 12. A slot 34 is formed at the end of each extended portion 32. A narrow edge of a tool or a key-like tool may be inserted into or indexed with the slots 34 to prevent rotation of the inserts 13 during torquing of the nut. This "wrenching" effect could be achieved by other means, for example, by extending the extended portion 32 further beyond the shank end, and providing holes in the further extended portion into which a pin may be inserted to prevent rotation of the inserts 13. Other features alternatively may be added to the further extended portion, such as internally or externally faceted surfaces for interaction with wrenching tools which counteract the initial rotation of the inserts 13.

When the inner surface 28 of an insert 13 bears against the pin inset portion 23 and the fastener 10 is tightened, the distal-facing surface 29 bears against the head-facing shoulder 25 of the pin 12. As long as the insert 13 has not so expanded to entirely fill the void between the shoulders 25 and 26, there normally will be some space between the head-facing surface 30 of the insert 13 and the distal-facing shoulder 26 of the pin 12, as shown in FIG. 2. Preferably the shell inserts 13 are each formed of a high-temperature refractory metal or superalloy, and the threads are designed such that thread ultimate shear stress will be at least equal to pin 12 tensile strength. Although the fastener 10 has two shell inserts 13, alternatively it could include a single split insert ring or more than two inserts.

The internally threaded member or nut 16 has a selected axial thickness and is threaded such that it can be screwed onto the threaded outer surfaces 31 of the shell inserts 13 to maintain the inserts 13 in abutting seated relationship with the inset portion 23 of the pin 12. The nut 16 should be formed of the same material as the shell inserts 13, or at least of a material which has a very similar coefficient of thermal expansion to minimize strain on the threads during thermal expansion.

Those fastener parts, in which concentrated shear forces act through small areas, generally bear the greatest shear stresses in the fastener. These parts often are the finer parts of the fastener, such as the threads. Ceramic materials generally are not as effective as many metals and alloys at bearing concentrated shear stresses. Therefore the preferred pin 12 is designed so that the axial shear stresses act along its relatively large head-facing shoulder 25. This design eliminates the necessity of having fine threading on the ceramic pin 12 itself. The threaded shell inserts 13 and nut 16, which actually bear the concentrated axial shear stresses, are formed from metal or alloy. For example, the shell inserts 13 and nut 16 shown preferably are made from Incoloy TM MA-956, a dispersion strengthened ferrous alloy. Among the other refractory metals and alloys which may be used in the inserts 13 and nut 16, are those which include stainless steel, nickel, tungsten, columbium, tantalum, and rhenium.

The sheets 11 shown in FIG. 2 are formed with carbon-carbon (C—C) fibers which are positioned essentially two-dimensionally in the plane of the sheets 11. The sheets 11 have a low positive to low negative coefficient of thermal expansion in the planar directions, but a higher coefficient of thermal expansion in the vertical or axial direction—close to that of columbium metal. The pin 12 has a relatively low coefficient of axial thermal expansion in comparison to the metal nut 16. For the pin 12 to match the combined axial expansion of the sheets 11 and nut 16, the pin 12 has to be "lengthened" by means of a lower thermal expansion spacer 17 placed between the nut 16 and the sheets 11, or between the pin head 19 and the sheets 11.

The spacer 17 is formed with aluminum titanate (Ti$O_2$—Al$_2$O$_3$) ceramic (monolithic ceramic) or some other material which has a very small or negative coefficient of thermal expansion. For example, the spacer 17 also may be formed with hafnium titanate (TiO$_2$—HfO$_2$). The spacer 17 has a central hole 33 of greater cross-sectional dimension than that of the distal portion 22 or of the proximate portion 21, so that the spacer 17 can be placed over the shank 20 of the pin 12 between the sheets 11 and the nut 16 when the fastener 10 is assembled. Since the shell inserts 13 can be placed over the inset portion 23 and distal portion 22 after the spacer 17 is positioned in place, the central hole 33 in the spacer 17 can be of smaller cross-sectional dimension than the shift inserts 13 when they are assembled against the inset portion 23 of the shank 20.

The spacer 17 preferably should have a selected axial thickness ($t_s$) such that $$t_s = \frac{t_m\alpha_m + t_e\alpha_e - (t_e + t_m)\alpha_p}{(\alpha_p - \alpha_s)} t_e$$

wherein $t_s$ = spacer 17 axial thickness, $t_e$ = combined axial thickness of sheets or elements 11, $t_m$ = axial thickness of internally threaded member (nut 16), $\alpha_s$ = coefficient of axial thermal expansion of spacer 17, $\alpha_e$ = coefficient of axial thermal expansion of combined sheets or elements 11, $\alpha_m$ = coefficient of axial thermal expansion of internally threaded member, (nut 16)

$\alpha_p$ = coefficient of axial thermal expansion of pin.

As shown in FIG. 2, the fastener 10 optionally includes the small ceramic washers 15 which are sized to fit over the distal portion 22 and proximate portion 21 of the pin shank 20 between the sheets 11 and spacer 17 and between the spacer 17 and nut 16. The small washers 15 separate the C—C material, the metals or alloys, and the ceramic materials to prevent possible reactions therebetween. The small washers 15 are flexible and therefore can compensate for small irregularities in the surfaces of the component parts of the fastener 10. The axial thickness of the small washers 15 is quite small and need not be considered in calculating the axial dimensions of the other fastener components. Although not shown, a small washer 15 also may be placed between the pin head 19 and the sheets 11.

The high-temperature, low-thermal expansion fastener 10 may be used as follows. Before assembly of the fastener 10, the thickness ($t_s$) of the spacer 17 should be determined in accordance with the equation disclosed above. Once the spacer 17 is properly sized, the sheets 11 may be placed together with their holes 14 aligned, whereupon the shank 20 is inserted into the holes 14 until the head 19 abuts against one sheet 11. The user then may place in order over the shank 20 the proximate small washer 15 (optional), the spacer 17, and the distal small washer 15 (optional). The shell inserts 13 then can be placed on the shank 20 so that their inner surfaces 28 abut against the inset portion 23. Then the nut 16 may be placed over the shank 20 and abutting inserts 13, and rotated to the desired torque against the distal small washer 15.

When the fastener 10 and sheets 11 are heated and thereby change their dimensions, if the spacer 17 is of appropriate thickness, the tension within the pin shank 20 should not change appreciably even at temperatures above 1500° F. The fastener therefore is designed to match the differing thermal expansions of its various parts and of the sheets 11 to maintain a fairly consistent tension in the shank 20. The materials specified for use in the fastener 10 are stable at high temperatures. Additionally, these materials are chemically compatible at these temperatures. If for some reason the materials were not chemically compatible, utilization of the small washers 15 would aid in preventing interaction. The fastener 10 is of simple, lightweight construction and is easily disassembled and replaced.

The fastener 10 may also include the annular bushing disclosed in U.S. Pat. No. 4,834,569, the disclosure of which hereby is incorporated herein. Such an annular bushing serves to compensate for the differing coefficients of thermal expansion of the fastener and sheets 11 in the plane of the sheets.

It is to be understood that the present invention is not limited to the particular arrangement and embodiments of parts disclosed and illustrated herein, nor to the materials specified. It is intended that all matter contained in the foregoing description or shown the in the accompanying drawings shall be interpreted as illustrative and not limiting. Therefore the present invention embraces all such modified forms thereof as come within the scope of the following claims.

What is claimed is:

1. A fastener which can be used in a high temperature environment for joining at least two elements of selected thickness which each have a common aligned hole, comprising:
    (a) a pin, which includes a head of greater cross-sectional dimension than the aligned holes, and a shank which adjoins the head, the shank including a distal portion with smaller cross-sectional dimension than the head and an inset portion located between the head and distal portion and which has a smaller cross-sectional dimension than the distal portion such that a head-facing shoulder is formed near where the distal portion adjoins the inset portion;
    (b) at least one shell insert, each including an inner surface which is seatable in the inset portion; a distal-facing surface; and an outer surface which is threaded and which has a radius of curvature at least equal to a radius of curvature of the distal portion, said shell inserts being positionable around the inset portion of the shank so that their distal-facing surfaces can be placed in abutting relationship with the head-facing shoulder on the pin; and (c) an internally threaded member of selected axial thickness which can be screwed onto the threaded outer surface of said shell inserts to maintain the inserts in abutting relationship with the inset portion.

2. The fastener of claim 1 wherein the shank includes a proximate portion which extends between the head and inset portion and which is about equal in cross-sectional dimension to the cross-sectional dimension of the distal portion.

3. The fastener of claim 1 wherein the pin is formed of a monolithic ceramic material.

4. The fastener of claim 1 wherein the pin is formed of a ceramic matrix composite material.

5. The fastener of claim 1 wherein there are two shell inserts which are formed of a refractory metal having a thread shear strength at least equal to tensile strength of the material forming the pin.

6. The fastener of claim 1 wherein there are two shell inserts which are formed of a super alloy having a thread shear strength at least equal to a tensile strength of the material forming the pin.

7. The fastener of claim 1 wherein a coefficient of axial thermal expansion of the material forming the pin is similar to that of the elements.

8. The fastener of claim 1 further including a spacer having a central hole of greater cross-sectional dimension than the distal portion, so that said spacer can be placed over the pin shank between the elements and the internally threaded member.

9. The fastener of claim 8 wherein a coefficient of axial thermal expansion of the material forming the spacer is less than that of the material forming the pin.

10. The fastener of claim 8 wherein a coefficient of axial thermal expansion of the spacer is negative.

11. The fastener of claim 8 wherein the spacer has a selected axial thickness ($t_s$) such that $$t_s = \frac{t_m \alpha_m + t_e \alpha_e - (t_e + t_m)\alpha_p}{(\alpha_p - \alpha_s)} t_e$$

wherein
$t_s$ = spacer axial thickness,
$t_e$ = combined axial thickness of elements,
$t_m$ = axial thickness of internally threaded member,
$\alpha_s$ = coefficient of axial thermal expansion of spacer,
$\alpha_e$ = coefficient of axial thermal expansion of combined elements,
$\alpha_m$ = coefficient of axial thermal expansion of internally threaded member, p1 $\alpha_p$ = coefficient of axial thermal expansion of pin.

12. The fastener of claim 1 wherein the inset portion is cylindrical in shape, and there are two shell inserts on each of which the inner surface is semicylindrical with a radius of curvature about equal to a radius of curvature of the inset portion, so that the inner surfaces are conformable to the inset portion.

13. The fastener of claim 1 wherein each shell insert includes an extended portion which extends to cover the pin distal portion when the inner surface of the shell insert is seated in the inset portion of the pin.

14. The fastener of claim 1 wherein each shell insert includes means for preventing rotation of the insert when the internally threaded member is rotated over the insert.

* * * * *